United States Patent [19]
Hattori et al.

[11] Patent Number: 5,802,209
[45] Date of Patent: Sep. 1, 1998

[54] APPARATUS AND METHOD FOR COMPRESSING AND RESTORING BINARY IMAGE HAVING MULTITONE

[75] Inventors: Toshiyuki Hattori; Ryuji Oomoto; Kiyoaki Murai, all of Nagano, Japan

[73] Assignee: Seiko Epson Corporation, Tokyo, Japan

[21] Appl. No.: 672,044

[22] Filed: Jun. 26, 1996

[30] Foreign Application Priority Data

Jun. 27, 1995 [JP] Japan ................................ 7-160554
Apr. 25, 1996 [JP] Japan ................................ 8-105316

[51] Int. Cl.⁶ ........................................ G06K 9/00
[52] U.S. Cl. ........................................ 382/232; 382/166
[58] Field of Search ................... 358/261.3, 261.1, 358/456, 524, 429, 296, 298, 457, 459; 348/384; 395/109; 346/3, 78; 382/180, 190, 192, 194, 201, 203, 205, 209, 217, 232, 237, 241, 243, 272, 274, 275, 286, 299, 300, 308, 312, 162, 163, 165, 166, 167, 169, 181, 224, 254, 269, 276, 293, 307, 309

[56] References Cited

U.S. PATENT DOCUMENTS

| | | | |
|---|---|---|---|
| 4,084,196 | 4/1978 | Tisue et al. | 358/283 |
| 4,084,259 | 4/1978 | Cahill et al. | 364/900 |
| 4,150,400 | 4/1979 | Wong | 358/260 |
| 4,596,993 | 6/1986 | Erlichman | 346/76 PH |
| 4,916,545 | 4/1990 | Granger | 358/456 |
| 4,926,251 | 5/1990 | Sekizawa et al. | 358/75 |
| 5,535,013 | 7/1996 | Murata | 358/432 |
| 5,625,755 | 4/1997 | Shu | 395/109 |

FOREIGN PATENT DOCUMENTS

| | | | |
|---|---|---|---|
| 0 109 005 | 5/1984 | European Pat. Off. | H04N 1/40 |
| WO 81/02206 | 8/1981 | WIPO | G03F 1/00 |
| WO 95/33330 | 12/1995 | WIPO | H04N 1/405 |

*Primary Examiner*—Leo Boudreau
*Assistant Examiner*—Bijan Tadayon
*Attorney, Agent, or Firm*—Sughrue, Mion, Zinn, Macpeak & Seas, PLLC

[57] ABSTRACT

When an N-times density binary image having N+1 tones is compressed, only the tone of each pixel is converted into a compressed code. The compressed code has a number of bits necessary and sufficient to distinguish between the tones. When a triple-density image having 4 tones is compressed, for example, the tone of each pixel is converted into a 2-bit compressed code. When the original N-times density is restored from the compressed code, there is formed a dot pattern in which the number of dots corresponding to the tone, as represented by the compressed code of each pixel, are situated closer to the darker one of the two adjoining pixels.

8 Claims, 7 Drawing Sheets

FIG. 3
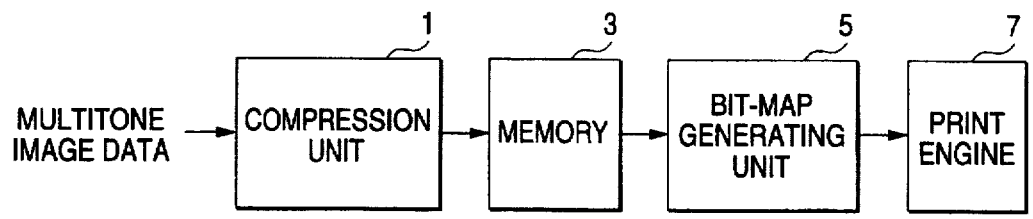
FIG. 4
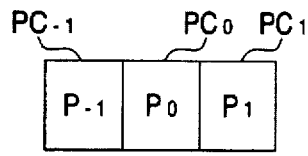
FIG. 5
| COMPRESSED CODE | TONE ($P_0$) | DOT PATTERN | |
|---|---|---|---|
| | | $P_1 \geq P_{-1}$ | $P_1 < P_{-1}$ |
| 00 | 0 | | |
| 01 | 1 | | |
| 10 | 2 | | |
| 11 | 3 | | |

FIG. 7

$$A \begin{bmatrix} 48, & 40, & 32, & 26, & 18, & 10, & 50, & 42, & 34, & 56, & 64, & 72, & 82, & 90, & 98, & 58, & 66, & 74 \\ 24, & 16, & 8, & 4, & 2, & 0, & 28, & 20, & 12, & 80, & 88, & 96, & 102, & 104, & 106, & 84, & 92, & 100 \\ 46, & 38, & 30, & 22, & 14, & 6, & 52, & 44, & 36, & 54, & 62, & 70, & 78, & 86, & 94, & 60, & 68, & 76 \\ 57, & 65, & 73, & 83, & 91, & 99, & 59, & 67, & 75, & 49, & 41, & 33, & 27, & 19, & 11, & 51, & 43, & 35 \\ 81, & 89, & 97, & 103, & 105, & 107, & 85, & 93, & 101, & 25, & 17, & 9, & 5, & 3, & 1, & 29, & 21, & 13 \\ 55, & 63, & 71, & 79, & 87, & 95, & 61, & 69, & 77, & 47, & 39, & 31, & 23, & 15, & 7, & 52, & 45, & 37 \end{bmatrix}$$

$$B \begin{bmatrix} 70, & 70, & 60, & 60, & 50, & 50 \\ 60, & 60, & 50, & 50, & 40, & 40 \\ 50, & 50, & 40, & 40, & 30, & 30 \\ 40, & 40, & 30, & 30, & 20, & 20 \\ 30, & 30, & 20, & 20, & 10, & 10 \\ 20, & 20, & 10, & 10, & 0, & 0 \end{bmatrix}$$

$$C \begin{bmatrix} 1, & 1, & 1, & 1, & 1, & 1, & 1, & 1, & 1, & 1, & 0, & 0, & 0, & 0, & 0, & 0, & 0, & 0 \\ 1, & 1, & 1, & 1, & 1, & 1, & 1, & 1, & 1, & 0, & 0, & 0, & 0, & 0, & 0, & 0, & 0, & 0 \\ 1, & 1, & 1, & 1, & 1, & 1, & 0, & 0, & 1, & 0, & 0, & 0, & 0, & 0, & 0, & 0, & 0, & 0 \\ 0, & 0, & 0, & 0, & 0, & 0, & 0, & 0, & 0, & 0, & 0, & 0, & 0, & 1, & 1, & 0, & 0, & 0 \\ 0, & 0, & 0, & 0, & 0, & 0, & 0, & 0, & 0, & 0, & 1, & 1, & 1, & 1, & 1, & 0, & 0, & 0 \\ 0, & 0, & 0, & 0, & 0, & 0, & 0, & 0, & 0, & 0, & 0, & 0, & 0, & 0, & 0, & 0, & 0, & 0 \end{bmatrix}$$

$$D \begin{bmatrix} 3, & 3, & 3, & 1, & 0, & 0 \\ 3, & 3, & 3, & 0, & 0, & 0 \\ 3, & 3, & 1, & 0, & 0, & 0 \\ 0, & 0, & 0, & 0, & 2, & 0 \\ 0, & 0, & 0, & 2, & 3, & 0 \\ 0, & 0, & 0, & 0, & 0, & 0 \end{bmatrix}$$

$$E \begin{bmatrix} 1, & 1, & 1, & 1, & 1, & 1, & 1, & 1, & 1, & 1, & 0, & 0, & 0, & 0, & 0, & 0, & 0, & 0 \\ 1, & 1, & 1, & 1, & 1, & 1, & 1, & 1, & 1, & 0, & 0, & 0, & 0, & 0, & 0, & 0, & 0, & 0 \\ 1, & 1, & 1, & 1, & 1, & 1, & 1, & 0, & 0, & 0, & 0, & 0, & 0, & 0, & 0, & 0, & 0, & 0 \\ 0, & 0, & 0, & 0, & 0, & 0, & 0, & 0, & 0, & 0, & 0, & 0, & 1, & 1, & 0, & 0, & 0, & 0 \\ 0, & 0, & 0, & 0, & 0, & 0, & 0, & 0, & 0, & 0, & 1, & 1, & 1, & 1, & 1, & 0, & 0, & 0 \\ 0, & 0, & 0, & 0, & 0, & 0, & 0, & 0, & 0, & 0, & 0, & 0, & 0, & 0, & 0, & 0, & 0, & 0 \end{bmatrix}$$

FIG. 10
| COMPRESSED CODE | TONE ($P_0$) | $P_1 > P_{-1}$ | $P_1 < P_{-1}$ |
|---|---|---|---|
| 000 | 0 | 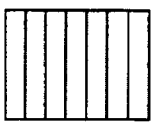 | |
| 001 | 1 |  | 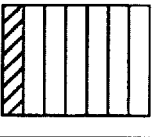 |
| 010 | 2 |  |  |
| 011 | 3 |  |  |
| 100 | 4 | 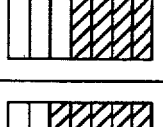 | 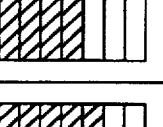 |
| 101 | 5 | 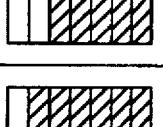 | 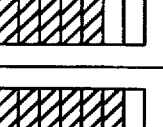 |
| 110 | 6 | 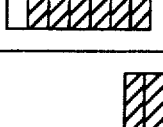 | 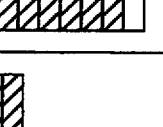 |
| 111 | 7 |  | |

APPARATUS AND METHOD FOR COMPRESSING AND RESTORING BINARY IMAGE HAVING MULTITONE

BACKGROUND OF THE INVENTION

1. Field of the Invention

The present invention relates to digital imaging apparatuses such as laser printers, inkjet printers, copying machines, and bit map displays, as well as to computer systems for performing digital image processing. More particularly, the present invention relates to improvements in the technology of compressing and restoring a multitone binary image.

2. Description of the Related Art

Most digital imaging apparatuses are designed to operate on images artificially expressed in the form of binary data. The binary data relate to picture elements of an image, referred to as pixels. Originally, digital imaging apparatuses could operate on images expressed as only the presence or absence of color; the data relating to the pixels simply expressed either a dot or a blank space.

Improvements in digital imaging technology now permit operation on images having more than just these two simple tones. Binary images with more than these two simple tones are referred to as having a multitone. In a multitone binary image, each pixel has a plurality of dot areas. By dividing a pixel into dot areas, intermediate tones can be achieved. The tone of a given pixel thus relates to the number of shaded dot areas of the pixel.

FIG. 1 shows an example of a pixel PC of a multitone binary image. The pixel is divided into two dot areas, D1 and D2. An image made up of pixels having two dot areas each is referred to as a double-density image. The tone P of pixel PC can have three values, or stages, as shown in FIG. 1. The two dot areas of the pixel permit three tones: a tone of P=0, where neither dot area is shaded, a tone of P=1, where only one dot area is shaded, and a tone of P=2, where both dot areas are shaded. As the figure shows, there are two possible arrangements for the pixel when the tone is P=1. Thus, in a double-density image, the possible tones are P=0, 1, or 2, and there are four useable arrangements of dot areas.

FIG. 2 shows another example of a pixel PC of a multitone binary image. In this example, pixel PC is divided into three dot areas D1, D2, and D3. An image made up of pixels divided into three dot areas each is referred to as a triple-density image. As the figure shows, the tone of the pixel can have one of four possible values, or stages. In particular, the three dot areas permit the expression of four different tones with P=0, 1, 2, or 3. The six useable arrangements of the dot areas are shown in the figure.

More generally, a pixel PC of a multitone binary image may be divided into N dot areas, D1 ... DN. An image made up of pixels divided into N dot areas each may be referred to as an "N-times density" image. The tone of a pixel so divided can have one of N+1 possible values, or stages, and the values can be expressed as P=0 ... N. In such an image, the N dot areas provide 2N useable arrangements of the dot areas.

In general, representing a multitone binary image requires a large amount of binary data. An N-times density image can primitively be represented by an N-bit code, in which 1 bit corresponds to 1 dot area. Representing an N-times density image in such a primitive fashion can result in a large quantity of data, however, and can require a correspondingly large capacity memory. To reduce the memory requirements of representing multitone binary image data, several methods have been developed which reduce the quantity of data through data compression.

A very basic compression method is to use compressed codes for distinguishing among all the possible dot patterns in a pixel. For a double-density multitone image made up of pixels as in FIG. 1, for example, there are four useable dot patterns: one pattern for P=0, two patterns for P=1, and one pattern for P=2. For a triple-density multitone image made up of pixels as in FIG. 2, for example, there are six useable dot patterns: one pattern each for P=0 or 3, and two patterns each for P=1 or 2. For an N-times density image, there are 2N useable dot patterns.

It is the number of useable dot patterns that determines the number of bits required to form a compressed code of sufficient length to distinguish among the dot patterns. For example, the four patterns in a dual-density multitone image can be completely represented by two bits. Thus, a dual-density multitone image normally requires the use of 2-bit compressed codes. Three bits are required to represent the six patterns in a triple-density multitone image, and so 3-bit compressed codes are required. A quadruple-density image (N=4) would have eight (2N) dot patterns. Since three bits can represent eight distinct values, a quadruple-density image would require 3-bit compressed codes.

The length, in bits, of the compressed codes used for a particular N-times density image is referred to as the "depth" of the compressed code. As such, under the basic compression method just described, the compressed codes used to represent the pixel tone of a pixel of a double-density multitone image have a depth of 2. According to the basic compression method, the triple-density and quadruple-density multitone images require compression codes with a depth of three.

This basic compression method poses several problems.

Firstly, when the number of dot areas N is small, this basic compression method does not actually achieve any compression effect. When N=2, as noted above, the depth of the compression code is 2. Thus, it takes the same amount of bits to represent the number of useable dot patterns as it does to send the corresponding uncompressed data. When N=3, the depth of the compression code is 3. Here again, it takes the same number of bits to represent the compression codes as it does to send the corresponding uncompressed data. As a result, no data compression effect occurs when N is less than four.

Secondly, the compressed codes of a compressed multitone image cannot be directly edited. That is, data compressed according to the above-described compression method cannot correctly be edited without first uncompressing the data.

For example, in photographic processing, which is representative of multitone image processing, it is often necessary to edit the image data. Editing operations include converting positive films to negative ones, overlapping characters on photographic paper, forming character dropouts out of photographs, photographically drawing characters, and so forth. Such operations involve the manipulation of binary data through logical operations, such as a logical OR operation. Unfortunately, logical operations on data compressed according to the basic compression method cannot be performed without causing corruption. For an editing operation on compressed data to be successful, it is necessary that the result of applying the logical operation to the compressed code be the same as if that logical operation had been applied to the raw data representing the dot pattern.

To explain further by example, when a positive film is converted to a negative one, a logical NOT calculation is applied to the compressed code. When overlapping a character on photographic paper, forming a character drop-out, or photographically drawing a character, the calculation is made so as to have a code with all 1's or all 0's logically ORed with the photographic compressed code. When a compressed code happens to have a value of all 1's or all 0's, it is simple to make the result of the logical operation conform to the result of applying that same logical operation to the uncompressed data representing the dot pattern.

More specifically, a compressed code having a value of all 0's may be allocated to a dot pattern with 0 dots, whereas a compressed code with all 1's may be allocated to a dot pattern with all N dots shaded. Such an arrangement will work fine when applying logical operations to compressed data relating only to dot patterns of all spaces or all dots (i.e., all 0's or all 1's). It will not work when tones other than P=0 and P=N are encountered. That is, when multitone image data is compressed according to the conventional basic compression method, the result of the above NOT calculation does not conform to the result of applying the same operation to the uncompressed data representing the dot pattern. As a result, no editing of compressed codes is feasible.

Although methods other than the basic compression method described above are known, they require complicated processes.

SUMMARY OF THE INVENTION

Therefore, an object of the present invention is to provide a technology for compressing an N-times density multitone image in which the compression effect is achievable even when N is small.

Another object of the present invention is to compress the data of an N-times density multitone image so that editing operations on the compressed data are feasible.

Still another object of the present invention is to make it possible to compress and restore an N-times density multitone image in a substantially simple and uncomplicated manner.

According to the present invention, a compressed code of M bits in depth is used to represent the N+1 tones of an N-times density image. An important feature of the invention is that, in the process of restoring the dot pattern of each pixel from the compressed codes, the compressed codes of adjoining pixels are referred to in addition to the compressed code of the particular pixel being restored. The dot pattern of each pixel so restored contains a number of dots corresponding to the tone represented by the compressed code of each pixel, and the dots are situated closer to the one of the two adjoining pixels having a darker tone.

According to the present invention, a compressed code may have a number of bits sufficient for distinguishing among N+1 tones of an N-times density image. In a triple density image, for example (i.e., N=3), the compressed code has a depth M of only 2 bits to distinguish among the four (N+1) different tones (P=0, P=1, P=2, P=3). The depth of 2 bits is equal to the depth of the compressed code for the double-density image under the aforesaid basic compression method, and is 1 bit less than the depth of the compressed code for a triple-density image compressed according to the basic compression method. Therefore, the quantity of data generated by compressing a triple-density image according to the present invention is only ⅔ of that generated by compressing the same triple-density image according to the basic compression method. As well, the number of distinguishable tones according to the present invention is ⅘ of the number of tones distinguishable in an identical amount of compressed data, compared to the basic compression method.

Thus, according to the present invention, the compression effect is achievable even in the N-times density image where N is as small as 3.

The compression effect is, needless to say, also achievable when N is large. According to the basic compression method, in a multitone image where N=7, a 4-bit compressed code is required to distinguish among the 2×7=14 dot patterns. According to the present invention, only a 3-bit compressed code is necessary. This is so because the present invention focuses not on distinguishing among the 14 dot patterns so much as distinguishing among the N+1=8 possible tones (P=0 ... P=7).

One of the general conditions under which the compression ratio according to the present invention remains higher than in the prior art is where the depth M of the compressed code satisfies the following relationship:

$$(N+1) <= (M\text{th power of } 2) <= (2N).$$

The dot pattern of each pixel of the N-times density image, restored according to the present invention, contains a number of dots corresponding to the tone represented by the compressed code of each pixel, and the dots are situated closer to an adjoining pixel which, of the two adjoining pixels, has a darker tone. Since the tone of a pixel of a triple-density image can have one of four values (i.e., P=0, 1, 2 or 3), the tone can be represented by a 2-bit compressed code. A pixel having a tone of value P=1 or P=2 has an intermediate tone. In general, pixels having a tone in which not all the dot areas are identical are intermediate tone pixels.

In pixels having intermediate tones in this triple-density example, the 1 or 2 dots of the dot pattern will be arranged as being "closer" to one of the two adjacent, or adjoining pixels. That is, in such a pixel with a tone of P=1, there is one dot area which has a dot, and two dot areas which have a space. The dot will occupy either the left dot area or the right dot area (putting the dot in the center dot area does not result in a useable dot pattern). When the dot occupies the left dot area, the dot is said to be arranged closer to the pixel that is on the left of the example pixel, and when the dot occupies the right dot area, the dot is closer to the pixel on the right.

According to the invention, the choice between the two dot patterns of an intermediate tone pixel is made so that the dots are closer to the one of the two adjoining pixels (i.e., closer to the left side adjoining pixel or closer to the right side adjoining pixel) which has a darkest tone value.

When the just-described method is used for data compression of the binary data of the triple-density image, it is possible correctly and accurately to restore six dot patterns (as shown in FIG. 2) from compressed codes that are only 2 bits in length. In other words, the present invention achieves a compression effect when N is as small as 3, since the depth of the compressed codes is less than the number of dot areas of the pixel.

Generally speaking, according to the invention, it is possible to compress and restore 2N different dot patterns using N+1 different compressed codes.

Moreover, the result of a NOT calculation with respect to the dot pattern thus restored completely conforms to the result of a NOT calculation with respect to the compressed code, as verified in the description of the preferred embodiment of the present invention given below. Therefore, editing of the compressed codes becomes feasible.

Since the dot or dots in the intermediate-tone dot patterns are attracted to the side of the adjoining pixel having a darker tone value, and thus coupled thereto, characters, diagrammatic figures, the contours of objects, and so forth are expressed more clearly and smoothly.

Although N=3 in the description of the preferred embodiment of the present invention given below, the present invention is applicable also to other values of N. Moreover, though a description will be given of an instance in which the present invention is applied to image processing in printers, according to the preferred embodiment thereof, the present invention is applicable to image processing in, for example, computers, copying machines, and the like.

BRIEF DESCRIPTION OF THE DRAWINGS

FIG. 3 is a block diagram showing a configuration of an image processing system for a printer as an embodiment of the present invention.

FIG. 4 is a diagrammatic view of three adjoining pixels.

FIG. 5 is a diagram illustrating the interrelationship among the pixel tones, the compressed codes, and the dot patterns of a triple-density image.

FIG. 7 is a diagram illustrating a specific example of the conversion process performed in the compression unit.

FIG. 10 is a diagram illustrating interrelationships among the pixel tones, compressed codes and dot patterns of a hepta-density (i.e., N=7) image.

DESCRIPTION OF THE PREFERRED EMBODIMENT

Figure 1:
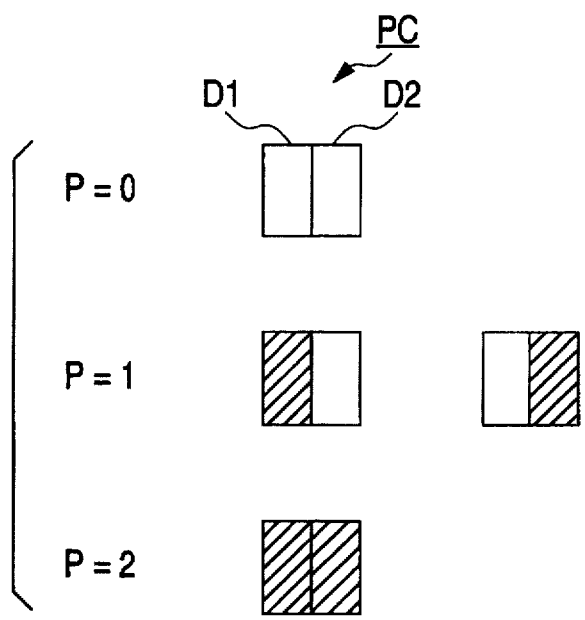
FIG. 1 is a diagrammatic view of the useable dot patterns of a double-density image.
Figure 2:
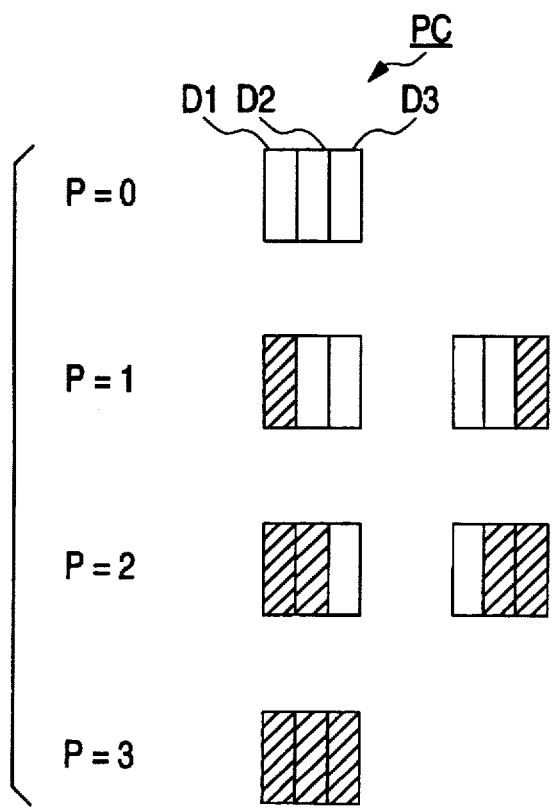
FIG. 2 is a diagrammatic view of the useable dot patterns of a triple-density image.

FIG. 3 is a block diagram showing a configuration of an image processing system for a printer as an embodiment of the present invention. In this example, the source data relates to a triple-density multitone image. Thus, each pixel PC has N=3 dot areas (D1, D2, and D3). It follows that there are 2N=6 useable dot patterns, and N+1=4 different tones.

A compression unit 1 receives source data relating to a multitone image. Each pixel in the source data is an 8-bit code capable of expressing one of 256 tones. The compression unit 1 converts the respective 8-bit code of each source data pixel to a corresponding 2-bit compressed code. The 2-bit compressed code is deep enough to express 4 different tones. Thus, the compression unit 1 compresses source data to provide, as an output, compressed image data.

The conversion method used in compression unit 1 can be any one of several adoptable conversion methods. One such method, described below in connection with this preferred embodiment, uses a dither matrix. The compressed image data, in which the respective tone of each pixel is in the form of a 2-bit compressed code, is output from the compression unit 1 and is stored in a memory 3 as stored compressed image data.

A bit-map generating unit 5 reads the stored compressed image data from the memory 3 and converts the data to bit-mapped data corresponding to a dot pattern of a triple-density image. More specifically, the bit-map generating unit 5 converts the 2-bit compressed code of each pixel to a 3-bit bit-mapped code in which each of the three bits represents either a dot or a blank space in a particular dot pattern. A bit-mapped code of 100, for example, might be used to represent a first dot area having a dot, a second dot area having a blank space, and a third dot area having a blank space.

A print engine 7 receives the bit-mapped data from the bit-map generating unit 5, and forms a pattern faithfully corresponding to this bit-mapped data, whereby it prints out the triple-density image on paper.

Either or both of the compression unit 1 and the bit-map generating unit 5 may each be installed in the printer itself, or in the printer driver of a host computer connected to the printer. Either or both may be realized as a software process or as a hardware circuit. According to this embodiment of the invention, the compression unit 1 is a software process, and is performed by either the printer driver in the host computer or by a controller in the printer.

In this embodiment, the bit-map generating unit 5 is a custom hardware circuit especially designed to be used in the printer.

FIGS. 4 and 5 diagrammatically illustrate the principles of image compression and restoration according to this embodiment of the invention.

FIG. 4 shows three consecutive pixels PC−1, PC0 and PC1. Each of these three pixels is on a certain line of a triple-density image. Pixel PC−1 adjoins PC0 on the left side thereof. PC1 adjoins PC0 on the right side thereof. Each of the three pixels has three respective dot areas. Pixels PC−1, P0, and P1 have respective tones P−1, P0, and P1.

FIG. 5 diagrammatically illustrates the interrelationships among the tones, the 2-bit compressed codes, and the useable dot patterns with respect to the central pixel PC0. In explaining the content of FIG. 5, discussion will initially relate to the various tones, and then will turn to the various dot patterns.

As shown in FIG. 5, there are four possibilities for the tone value P0 of pixel PC0. To wit, P0 can have a value of P0=0, 1, 2, or 3. A 2-bit compressed code "00" corresponds to the brightest tone P0=0; a compressed code "01" to the second brightest tone P0=1; a compressed code "10" to the third tone P0=2; and a compressed code "11" to the darkest tone P0=3. Thus, there is a one-to-one correspondence between the four 2-bit compressed codes and the four possibilities for the tone value P0.

According to the convention adopted for this embodiment of the invention, the dot pattern corresponding to the brightest tone (i.e., P0=0) has a blank space in each of the three dot areas. The dot pattern corresponding to the darkest tone (i.e., P0=3) has a dot in each of the three dot areas.

A dot pattern corresponding to the second brightest tone (i.e., P0=1) has a dot in only one of the three dot areas. As FIG. 5 shows, there are two useable dot patterns in which only one of the three dot areas has a dot. One of the patterns has a single dot on the right-hand side, and the other has a single dot on the left-hand side.

A dot pattern corresponding to the third brightest tone (i.e., P0=2) has a blank space in only one of the three dot areas. Here again, there are two useable dot patterns having only one blank space and two dots. One of these two patterns has two dots on the right-hand side, and the other has two dots on the left-hand side.

With respect to the intermediate tones (i.e., P0=1 and P0=2), no dot patterns are defined in which dots are not together on the left or right-hand side of the pixel. In other words, each defined dot pattern has all of the dots grouped together in a group of one or more dots, and the group of one or more dots is either on the left or on the right-hand side. Thus, no pattern is defined which has a space on the left, a dot in the center, and a space on the right. Also, no pattern is defined which has a dot on the left, a space in the center, and a dot on the right.

The selection of which of the two dot patterns defined for a pixel of intermediate tone is based on the respective tones P−1 and P1 of the adjoining left-hand pixel PC−1 and the adjoining right-hand pixel PC1. In particular, the selection in this embodiment is made so that the group of dots in the dot pattern is closest to the adjoining pixel having a darker respective tone. When the respective tones of pixels PC−1 and PC1 are the same, either of the two dot patterns of the intermediate tone pixel PC0 may be used. In this embodiment, when the two adjoining pixels have the same tone, the one of the two dot patterns selected is the one in which the group of dots is closest to the right-hand side.

Thus, where pixel PC0 has a tone P0=2, there are two possible dot patterns, as shown in FIG. 5. Each of the two patterns has two dots and one blank space. In accordance with the selection criteria just described, the dot pattern selected is the one which places the two dots next to the adjoining pixel which has the darker tone with respect to the other adjoining pixel.

What is noteworthy, in connection with the selection of one of the two dot patterns characteristic of an intermediate tone, such as P0=1 or 2, is that the selection of the one dot pattern is automatic, and is based on the surrounding pixels. This is what accounts for the fact that, according to the present invention, it is possible fully to reproduce six distinct dot patterns from compressed codes which, by themselves, identify only four distinct pixel tones. Thus, in a triple-density multitone image, two bits are sufficient to represent the four different tones.

In the basic compression method, three bits are required for each compressed code. According to the invention, only two bits are required. Therefore, a compression effect is achieved even when N is as small as 3.

Figure 6:
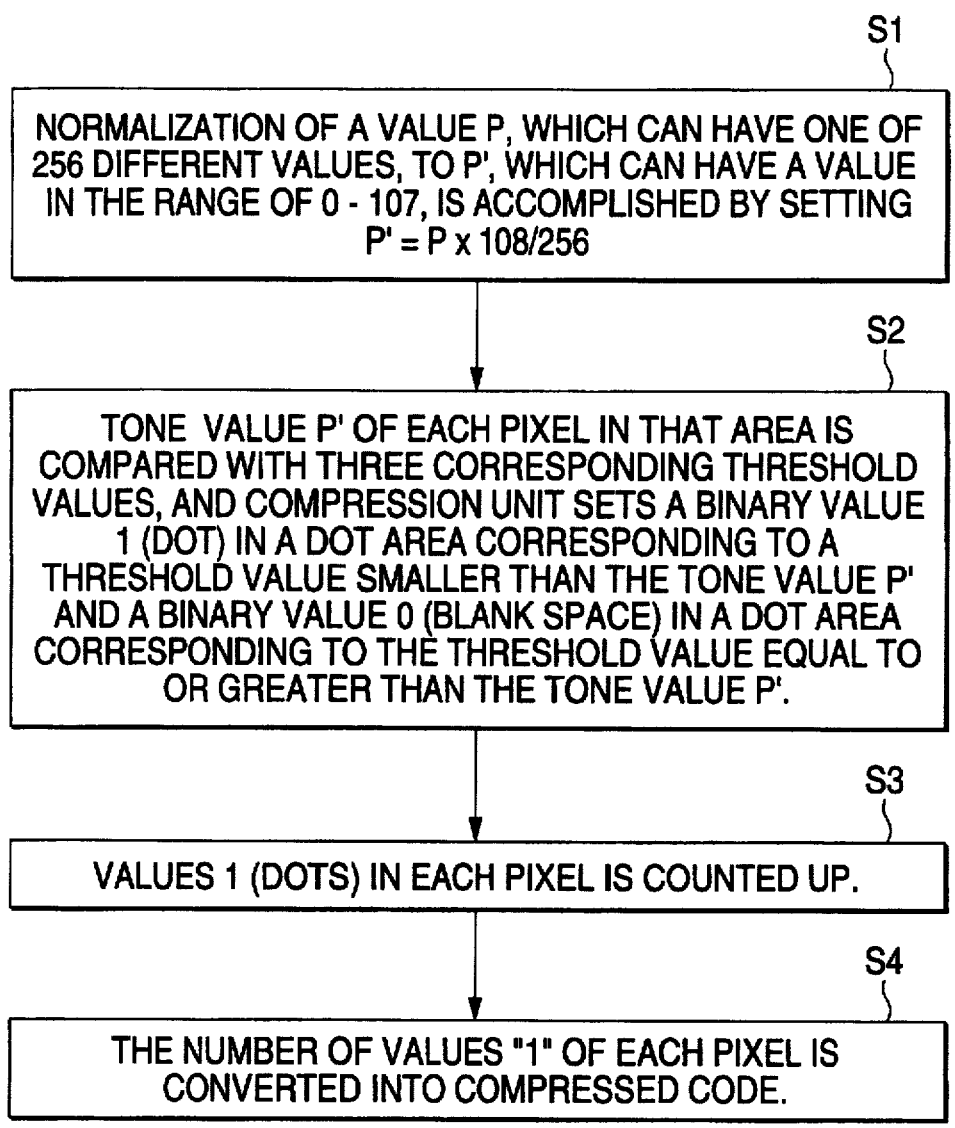
FIG. 6 is a flowchart showing a conversion process flow in a compression unit.

FIG. 6 shows the flow of a process which is performed by the compression unit 1 for converting 8-bit data concerning each pixel of a 256-tone image into a 2-bit compressed code. FIG. 7 shows a specific example of the conversion process.

The compression unit 1 first uses the dither method for converting the 256-tone image to a triple-density image in the bit-mapped data form. In the dither conversion process, a threshold matrix having a size of vertical 6 pixels× horizontal 6 pixels as shown in FIG. 7A is employed, for example. The threshold matrix is formed with vertical 6×horizontal 6 threshold values and each threshold value corresponds to each dot area in each pixel within an area of vertical 6 pixels×horizontal 6 pixels. Since the number of threshold values in this threshold matrix is 108 (i.e., vertical 6 pixels×3 dot areas per pixel×horizontal 6 pixels), the compression unit 1 normalizes the tone P of each pixel of the 256-tone image. The normalized tone is P'.

In particular, the normalization of a value P, which can have one of 256 different values, to P', which can have a value in the range of 0–107 (S1), is accomplished by setting P'=P×108/256.

Subsequently, the compression unit 1 overlays the threshold matrix on each area of vertical 6 pixels×horizontal 6 pixels within the image thus normalized and compares the tone value P' of each pixel in that area with the three corresponding threshold values. Further, the compression unit 1 sets a binary value 1 (dot) in a dot area corresponding to a threshold value smaller than the tone value P' and a binary value 0 (blank space) in a dot area corresponding to the threshold value equal to or greater than the tone value P'. Thus the tone P' of each pixel is converted into a 3-bit code representing a dot pattern having three dot areas. For example, the area of vertical 6 pixels×horizontal 6 pixels having the normalized tone value P' as shown in FIG. 7B is converted into a dot pattern of the triple-density image of vertical 6 dots×horizontal 18 dots as shown in FIG. 7C.

Then, the compression unit 1 counts up the values 1 (dots) in each pixel (S3). The number of dots thus counted designates the tone P0 shown in FIG. 5. The number of dots of each pixel in the dot pattern shown in FIG. 7C is like what is shown in FIG. 7D. Then the compression unit 1 converts the tone P0 (the number of dots) of each pixel into the 2-bit compressed code shown in FIG. 5 (S4) and writes the compressed code in the memory 3.

Figure 8:
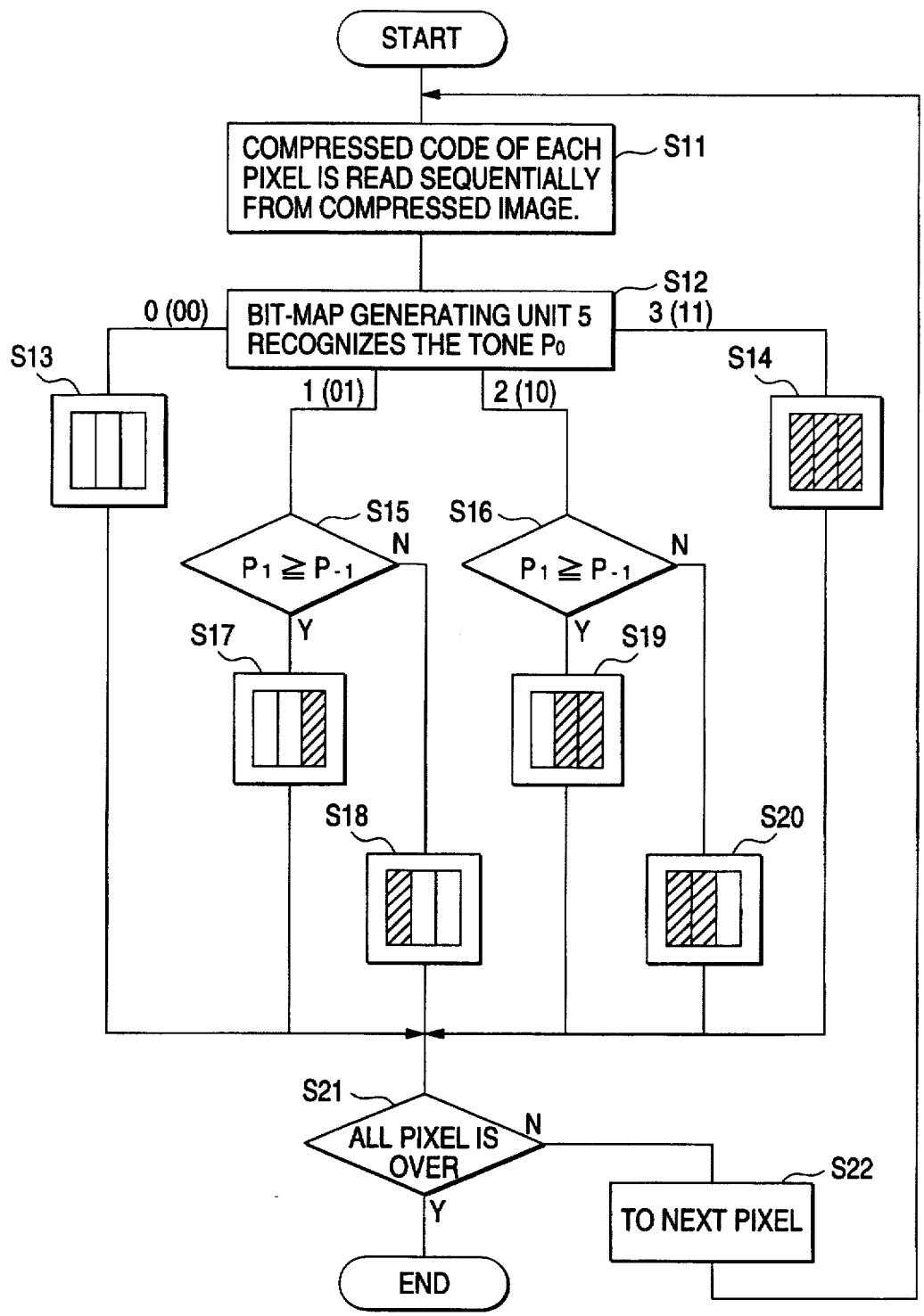
FIG. 8 is a flowchart showing a conversion process flow in a bit-map generating unit.

FIG. 8 shows the flow of a process performed by the bit-map generating unit 5 to convert the stored compressed image data into bit-mapped data corresponding to dot patterns of the image. In particular, the process describes how a particular 2-bit compressed code for a given pixel is converted into a 3-bit bit-mapped code in which each of the three bits represents either a dot or a blank space in a particular dot pattern.

The bit-map generating unit 5 first reads the 2-bit compressed code of each pixel sequentially from the compressed image in the memory 3 in the order of raster scanning (S11, S22). Then the bit-map generating unit 5 recognizes the tone P0 of the pixel PC0 out of the compressed code thus read (S12). In particular, when the 2-bit compressed code="00" (i.e., when the tone is P0=0), step S13 is performed to generate a bit map for a dot pattern having only blank spaces. When the code="11" (i.e., when the tone is P0=3), step S14 is performed to generate a bit map corresponding to a dot pattern of only dots.

When the code is "01" (i.e., when the tone of pixel PC0 is P0=1), step S15 is performed to compare the respective tone of pixel PC−1 with the respective tone of PC1. Note that here, the higher the value of the tone, the darker the tone is. Thus, when PC1 (i.e., the right-hand adjoining pixel) has a tone P1 which is greater than the tone P−1 of pixel PC−1 (i.e., the left-hand adjoining pixel), step S17 is performed to produce a bit-map corresponding to a dot pattern in which the single dot is closest to the right-hand side of pixel PC0. When PC1 has a tone P1 equal to the tone P−1 of pixel PC−1, the same result obtains. On the other hand, when PC1 has a tone P1 which is less than (i.e., less dark than) the tone P−1 of pixel PC−1, step S18 is performed to produce a bit-map corresponding to a dot pattern in which the single dot is closest to the left-hand side of pixel PC0.

Similar processing occurs when the tone P0 of pixel PC0 is 2 (i.e., when the compressed code is "10"), except that steps S16, and one of steps S19 and S20, are performed in order to select the appropriate one of the two dot patterns of the intermediate tone pixel.

The process mentioned above is repeated for all the pixels (S21). Thereby, each 2-bit compressed code is converted into a 3-bit bit-mapped code for use by print engine 7.

Figure 9:
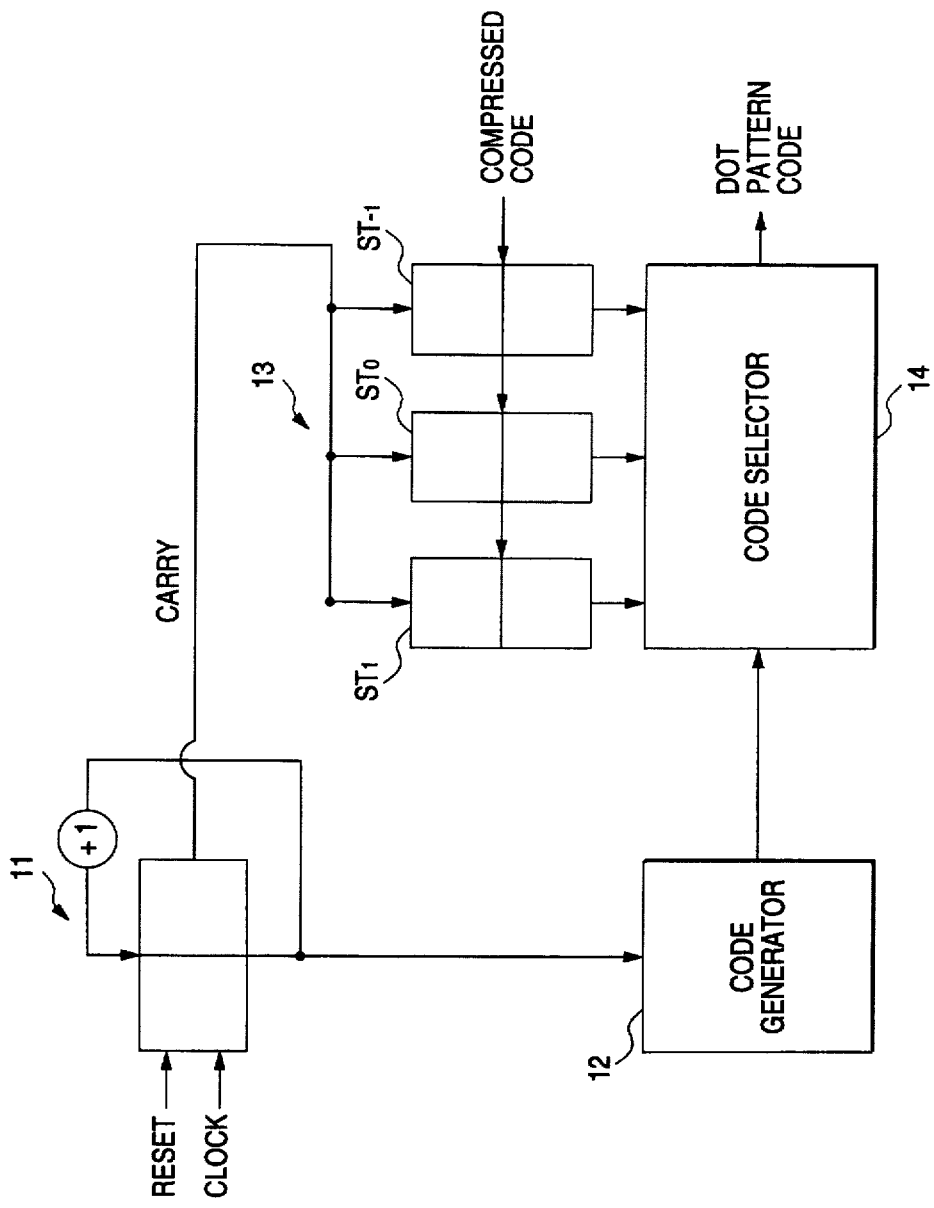
FIG. 9 is a diagram illustrating the hardware configuration of the bit-map generating unit.

FIG. 9 shows the hardware configuration of the bit-map generating unit 5.

The bit-map generating unit 5 operates in synchronization with a clock pulse, and outputs a 1-bit code representing one dot or one blank space in each period of the clock pulse. That is, a 3-bit bit-mapped code representing the dot pattern of a given pixel is produced every three clock pulse periods.

A counter 11 is a 2-bit ternary counter which counts upward in response to the clock pulse. On receiving a reset pulse, the counter 11 initially resets the count to "00". Then the count is changed from "00" to "01", from "01" to "10", and from "10" back to "00" in synchronization with the clock pulse. Each time the count is returned to "00", the counter 11 outputs a carry pulse.

A code generator 12 generates a 6-bit code in response to the 2-bit count output from counter 11.

When the 2-bit count of the counter="00", code generator 12 outputs, as the 6-bit code, "000111". When the count is "01", the code is "001110". When the count is "10", he code is "011100". The particular 6-bit code output by the code generator 12 is provided, in parallel, to a code selector 14. For each of these three codes, the leftmost bit shall hereafter be referred to as the sixth bit and the rightmost shall be called the first bit.

Code selector 14 is what actually outputs, one bit at a time, the bit-mapped data corresponding to the compressed codes. The code selector 14 outputs only a selected one of the six bits provided to it, in parallel, by code generator 12. In particular, code selector 14 outputs a "selected" one of the six bits.

For example, assume that the count of counter 11 is "00". When this is the case, code generator 12 is providing "000111" to code selector 14 as a 6-bit code. The first bit thus has a value of "1", and the sixth bit has a value of "0". If the code selector has "selected" the sixth bit, the output of the code selector is the value of the sixth bit (namely, "0"). Now assume that the counter has advanced to "01". When this is the case, code generator 12 provides "001110" as the 6-bit code. The sixth bit now has a value of "0". If the code selector still selects the sixth bit, the output of the code selector is now a "0". When the counter advances to "10", the 6-bit code is "011100". If the code selector still selects the sixth bit, the output of the code selector is now another "0". In this manner, the code selector has output "000" in three clock periods. This particular 3-bit code represents the dot pattern shown at Step S13 of FIG. 8.

If the first bit had been selected, however, "1" ... "0" ... "0" would have been output. This 3-bit code represents the dot pattern shown at Step S17 of FIG. 8.

A shift register 13 is a 2-bit, 3-stage shift register. The shift register 13 operates in synchronization with a carry pulse from the counter 11 and also receives a 2-bit compressed code of a new pixel from the memory 3. Therefore, the compressed codes PC1, PC0 and PC−1 of three continuous pixels shown in FIG. 4 are held in the shift register 13. The compressed code of the left-hand pixel PC−1 is held at the initial stage ST−1; that of the central pixel PC−1 at the second stage ST0; and that of the right-hand pixel at the third stage ST+1. The code selector 14 monitors the three compressed codes.

When the compressed code of the central pixel PC0 from the central stage ST0 of the shift register 13 is "00", the code selector 14 selects the sixth digit (i.e., the leftmost bit) of the 6-bit code from the code generator 12. When the compressed code of PC0 is "11", the code selector 14 selects the third digit. When the compressed code of the central pixel PC0 is "01", however, the code selector 14 compares the compressed code from the initial stage ST−1 with that from the third stage ST+1; when the former is greater than the latter, the code selector 14 selects the fifth digit; otherwise it selects the first digit. In a similar fashion, when the compressed code of the central pixel PC0 is "10", the code selector 14 compares the compressed code from the initial stage ST−1 with that from the third stage ST+1. When the former is greater than the latter, it selects the fourth digit, and otherwise selects the second digit. As a result, the 3-bit bit-mapped code representing the dot pattern of the central pixel PC0 shown in FIG. 5 is serially output from the code selector 14.

One advantage of the invention is that a logical operation, when performed on any of the compressed codes, has the same effect as if the operation had been applied to the corresponding dot pattern. That is, the 3-bit bit-mapped code, which represents a dot pattern of the triple-density image, and which has been output from the bit-map generating unit 5, is such that the result of a NOT calculation (inversion) with respect to the compressed code completely conforms to the result of a NOT calculation (inversion) with respect to the corresponding dot pattern. This is clear from the dot patterns of FIG. 5.

For example, the compressed code "00" corresponds to a dot pattern of all blank spaces. When the value of each bit of the code is inverted, the compressed code becomes "11", which corresponds to a dot pattern of all dots. Thus, the application of a NOT operation to the compressed code has the same effect as if it had been applied to the dot pattern.

The compressed code "01", for example, corresponds to a dot pattern of one dot and two blank spaces. When a NOT operation is applied to the compressed code, the result is "10", which corresponds to a dot pattern having one blank space and two dots. Here, as well, the application of an inversion operation to the compressed code has the same effect as if it had been applied to the dot pattern.

Since logical operations can be applied to the compressed codes with the same effect as applying the same operation to the corresponding, uncompressed dot pattern, it is thereby possible to edit images by editing the compressed codes.

The triple-density image that is thus output after restoration of the data according to the invention is substantially similar to the triple-density image that would have been generated without compressing and restoring the data. That is, the data produced under the dither method (by compression unit 1) is almost the same as the data output by the bit-map generating unit 5.

FIG. 7C, as explained above, shows the result of applying the dither method to the image data of FIG. 7A. FIG. 7E shows the corresponding output of the bit-map generating unit 5. The difference between the two figures appears in the pixel surrounded by a rectangle.

The difference is that, in FIG. 7C, the dot areas of the pixel in the same position as the pixel surrounded by a rectangle in FIG. 7E had the values (0, 0, 1), but in FIG. 7E, the values are (1, 0, 0). The result in FIG. 7E occurs because the pixel (i.e., PC−1) to the left of the highlighted pixel (i.e., PC0) has a darker tone (P−1=3) than the tone (P1=0) of the pixel to the right (i.e., P1). The total number of dots in the dot areas of the pixel, that is, the tone, remains unchanged.

In the case of a laser printer or a copying machine in particular, an isolated, extremely small dot is easily attracted by an adjoining large mass of dots and fused therewith because of the properties of dots that have electrostatically been formed. Assuming that the dot pattern indicated in FIG. 7C is output, it is highly probable that the dot pattern shown in FIG. 7E is printed. Since the size of each individual dot is extremely small (e.g., the diameter of a ⅓ dot of one pixel in the case of a 600 dpi engine is approximately 0.01 mm), the human eyes are hardly able to recognize the position of one dot.

Since the dot in the triple-density image thus output is positioned on the side of the pixel which is adjacent the darker of the two adjoining pixels, and is fused therewith, characters, diagrammatic figures, the contours of objects, and so forth are expressed clearly and smoothly.

FIG. 10 is a diagram illustrating the interrelationships among the pixel tones P0, the compressed codes, and the useable dot patterns of a hepta-density image (N=7). The compressed code has a depth of three bits, which is large enough to distinguish between the 8 different tones (i.e., P0=0, 1, 2, 3, 4, 5, 6, or 7). With N=7, there are 14 (i.e., 2×N) different useable dot patterns.

It is clear that here, too, the result of applying a logical NOT operation to any of the compressed codes will obtain the same result as if the operation is applied to the corresponding dot patterns. Since the result of the NOT calculation of the compressed code completely conforms to the result of the NOT calculation of the dot pattern, it is also possible to edit images by editing the compressed codes.

Even though N may be given a value other than those shown herein by way of example, the same effect is achievable.

What is claimed is:

1. An apparatus for restoring a compressed multitone image, said apparatus comprising:

compressed code generating means for generating a compressed code representing a tone of each pixel in an image having N+1 tones, said compressed code having a depth of M bits, said M bits being capable of distinguishing among said N+1 tones; and dot pattern generating means for generating a dot pattern having N dot areas, each representing one out of a dot and a blank space on receiving a compressed code of each pixel and compressed codes of both-side adjoining pixels, the number of dot areas indicative of said dot corresponding to the compressed codes of the respective pixels;

wherein the dot area indicative of said dot in said dot pattern is situated close to an adjoining pixel having a darker tone out of said both-side adjoining pixels.

2. An apparatus as claimed in claim 1, wherein the depth M of said compressed code satisfies the following relationship:

$$(N+1) \leq 2^M \leq 2N.$$

3. A computer system comprising:

a host computer having a printer driver for generating a compressed code representing a tone of each pixel in an image having N+1 tones, said compressed code having a depth of M bits, said M bits being capable of distinguishing among said N+1 tones, and a printer for generating a dot pattern having N dot areas, each representing one out of a dot and a blank space on receiving a compressed code of each pixel and compressed codes of both-side adjoining pixels, the number of dot areas indicative of said dot corresponding to the compressed codes of the respective pixels, wherein the dot area indicative of said dot in said dot pattern is situated close to an adjoining pixel having a darker tone out of said both-side adjoining pixels.

4. A method of restoring a compressed multitone image, said method comprising the steps of:

generating a compressed code representing a tone of each pixel in an image having N+1 tones, said compressed code having a depth of M bits, said M bits being capable of distinguishing among said N+1 tones, and generating a dot pattern having N dot areas, each representing one out of a dot and a blank space on receiving a compressed code of each pixel and compressed codes of both-side adjoining pixels, the number of dot areas indicative of said dot corresponding to the compressed codes of the respective pixels, wherein the dot area indicative of said dot in said dot pattern is situated close to an adjoining pixel having a darker tone out of said both-side adjoining pixels.

5. A method of processing image data pertaining to pixels of a multitone binary image, each of said pixels having N dot areas, said pixels including a current pixel and adjoining pixels, said method comprising the steps of:

defining, for said pixels, only N+1 tone values;

determining, for said current pixel, a corresponding one of said tone values;

providing, for said current pixel, an M-bit compressed code corresponding to said determined tone value;

defining, for said pixels, 2N dot patterns, each of which corresponds to only one of said N+1 tone values, and each of which has N dot areas, wherein each of said dot areas of said dot patterns is one of a dot and a blank space; and selecting, for said current pixel, one of said dot patterns on the basis of said determined tone value of said current pixel.

6. The method as set forth in claim 5, further comprising the step of performing said determining step and said providing step for said adjoining pixels to provide, for each of said adjoining pixels, a respective determined tone value;

wherein one of said N+1 tone values is an intermediate tone having said defined dot pattern such that said dot areas thereof include at least one said dot and at least one said blank space;

wherein when said determined tone value of said current pixel corresponds to said intermediate tone, the selection in said selecting step is further based on said respective determined tone value of each of said adjoining pixels.

7. The method as set forth in claim 6, wherein $2^M$ is not less than N+1, and wherein $2^M$ is not greater than 2N.

8. The method as set forth in claim 7, wherein when said determined tone value of said current pixel corresponds to said intermediate tone, said selected dot pattern has said at least one dot situated closer to one of said adjoining pixels having a darkest respective determined tone value.

* * * * *